(12) United States Patent
Channapragada et al.

(10) Patent No.: US 11,871,094 B2
(45) Date of Patent: *Jan. 9, 2024

(54) SYSTEMS AND METHODS FOR REARRANGING A TRAILER FOR MEDIA CONTENT BASED ON SPOILER INFORMATION

(71) Applicant: Rovi Guides, Inc., San Jose, CA (US)

(72) Inventors: Srikanth Channapragada, Karnataka (IN); Vikram Makam Gupta, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,644

(22) Filed: Mar. 1, 2022

(65) Prior Publication Data

US 2022/0369004 A1 Nov. 17, 2022

Related U.S. Application Data

(63) Continuation of application No. 16/867,043, filed on May 5, 2020, now Pat. No. 11,297,400.

(51) Int. Cl.
| | |
|---|---|
| *H04N 21/8549* | (2011.01) |
| *H04N 21/45* | (2011.01) |
| *H04N 21/472* | (2011.01) |
| *H04N 21/431* | (2011.01) |
| *H04N 21/488* | (2011.01) |

(52) U.S. Cl.
CPC ..... *H04N 21/8549* (2013.01); *H04N 21/4312* (2013.01); *H04N 21/4532* (2013.01); *H04N 21/47202* (2013.01); *H04N 21/4882* (2013.01)

(58) Field of Classification Search
None
See application file for complete search history.

(56) References Cited

U.S. PATENT DOCUMENTS

| | | |
|---|---|---|
| 2003/0088872 A1 | 5/2003 | Maissel et al. |
| 2003/0093790 A1 | 5/2003 | Logan et al. |
| 2009/0148133 A1 | 6/2009 | Nomura et al. |
| 2015/0033104 A1 | 1/2015 | Zhang |
| 2016/0105708 A1 | 4/2016 | Packard et al. |
| 2020/0404372 A1 | 12/2020 | Di Loreto et al. |
| 2021/0352382 A1 | 11/2021 | Channapragada et al. |

*Primary Examiner* — James R Marandi
(74) *Attorney, Agent, or Firm* — Haley Guiliano LLP

(57) ABSTRACT

Systems and methods are provided herein for rearranging the order of a plurality of segments of a trailer for media content, based on a retrieved viewing history of at least one user watching the trailer. Based on the retrieved viewing history, it is determined whether any of the plurality of segments arranged in a predetermined order contain spoiler information for the at least one user. Responsive to the determination that at least one of the plurality of segments contains spoiler information, a position of the at least one segment within the trailer is rearranged to generate a rearranged order of the plurality of segments, and the trailer in the rearranged order is generated for display.

20 Claims, 6 Drawing Sheets

| | User ID | Game of Thrones Viewing History (Latest Episode) |
|---|---|---|
| U1 | Andy R. | Season 4, Episode 7 |
| U2 | John H. | Season 5, Episode 10 |
| U3 | Sarah S. | Season 6, Episode 10 |

SYSTEMS AND METHODS FOR REARRANGING A TRAILER FOR MEDIA CONTENT BASED ON SPOILER INFORMATION

CROSS-REFERENCE TO RELATED APPLICATIONS

This application is a continuation of U.S. patent application Ser. No. 16/867,043, filed May 5, 2020 (now allowed), the disclosure of which is hereby incorporated by reference herein in its entirety.

BACKGROUND

The present disclosure is directed to systems and methods for rearranging a trailer for media content, and, more particularly, for rearranging a trailer for media content based on spoiler information.

SUMMARY

As video on demand (VOD) content has proliferated, users have consumed more and more media content. Additionally, because multi-part media content (e.g., TV shows, movie series, multi-part series) are increasingly available as VOD content, users increasingly watch multi-part media content at their own pace. Trailers advertising such media content may be shown before a new season or episode is set to be released. Trailers often include information from past seasons or episodes, as well as teaser information from the new season or episode. If a user has not watched all of the seasons or episodes leading up to the new season or episode that the trailer is advertising, certain information in the trailer may be a spoiler for that user, which may render the user's viewing experience unsatisfactory. Spoilers are events in a content that reveal important plot elements that a user does not currently know and that the user is not intended to know before watching the content. Some examples of spoilers include details of the conclusion of a plot or storyline that the user has not yet watched, plot twists, character deaths, climatic events, and similar such events.

In some cases, different users who have watched different parts of a same multi-part media content (e.g., "a content series"), may watch a trailer for that content series together. That is, not all of the users may have watched all of the episodes that are currently available (i.e., some users may not be "caught up" with the content series). In this case, certain parts of the trailer which contain spoilers for one user may not contain spoilers for another user. Thus, a way for showing a trailer to a user or a group of users without any of the users accidentally viewing spoiler information is desired.

Systems and methods are provided herein for rearranging the order of a plurality of segments of a trailer for media content, based on a viewing history of each of the at least one user watching the trailer. The viewing history of the at least one user is retrieved. Based on the retrieved viewing history, it is determined whether any of the plurality of segments contain spoiler information for the at least one user. The plurality of segments are arranged in a predetermined order. Responsive to the determination that at least one of the plurality of segments contains spoiler information, a position of the at least one segment within the trailer is rearranged to generate a rearranged order of the plurality of segments, and the trailer in the rearranged order is generated for display.

In some embodiments, the at least one user, who may be proximate to the display device for displaying the trailer, may be identified.

In some embodiments, the media content is part of a series comprising a plurality of episodes, and the viewing history of the at least one user indicates episodes that the user has watched among the plurality of episodes. In other embodiments, the viewing history of the at least one user indicates a latest episode that the user has watched among the plurality of episodes.

In some embodiments, the at least one user may include a plurality of users, and retrieving the viewing history may include retrieving a viewing history of each of the plurality of users.

In some embodiments, determining whether any of the plurality of segments of the trailer contain spoiler information may include determining, based on the retrieved viewing history of each of the plurality of users, whether any of the plurality of segments of the trailer contain spoiler information for any of the plurality of users.

In some embodiments, rearranging the position of the at least one segment may include: determining, for each of the at least one segment containing spoiler information, a number of users, among the plurality of users, that the segment contains spoiler information for; and rearranging the position of each of the at least one segment containing spoiler information for any of the plurality of users to the end of the plurality of segments in increasing order of the determined number of users that each of the at least one segment contains spoiler information for.

In some embodiments, generating for display the trailer in the rearranged order may include: determining users among the plurality of users who will be shown at least one segment containing spoiler information; and generating for display a personalized spoiler notification for each of the determined users.

In some embodiments, each of the personalized spoiler notifications is configured to be shown at least a predetermined time before the corresponding at least one segment containing spoiler information for the user is to be shown. In some embodiments, the predetermined time may be five seconds or less. In some embodiments, the personalized spoiler notification for each of the plurality of users may be overlaid on a portion of the trailer.

In some embodiments, determining whether any of the plurality of segments contain spoiler information for the at least one user may include: accessing a spoiler information database; comparing the viewing history of the at least one user and the plurality of segments with the accessed spoiler information database; and determining, based on a result of the comparing, whether any of the plurality of segments contain spoiler information for the at least one user.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Systems and methods are disclosed herein for playing a trailer for multi-part media content for a user or group of users who have not watched all of the available episodes of the multi-part media content, without accidentally revealing spoiler information to any of the users. Specifically, a media player application, implemented on a user equipment, may analyze the content segments of a trailer and determine, based on the viewing history of each user viewing the trailer, if any segments of the trailer contain spoiler information for any of the users. As described herein, multi-part media content is any media content series having a plurality of episodes or parts (e.g., a TV series, a podcast series, a movie series).

A trailer (or preview or advertisement) for media content is generally composed of a series of segments (e.g., short clips or excerpts) from the media content being advertised. Thus, the beginning and end of each of the segments may occur at natural breaks in the trailer. In the case of a media content series, a trailer may include segments from the new episode or season that the trailer is advertising, as well as segments from past episodes. For a user who has watched all of the available episodes prior to the new episode or season being advertised, segments of the trailer may show exciting or noteworthy parts of the media content series, without showing any spoiler information. However, if a user has not watched all of the available episodes prior to the new episode or season being advertised, the segments may contain spoilers (e.g., spoiler information) for that user. Unlike the media content that a trailer advertises, the order of the series of segments in the trailer may be much less important than the arrangement of the actual content comprising the media content.

Figure 1:
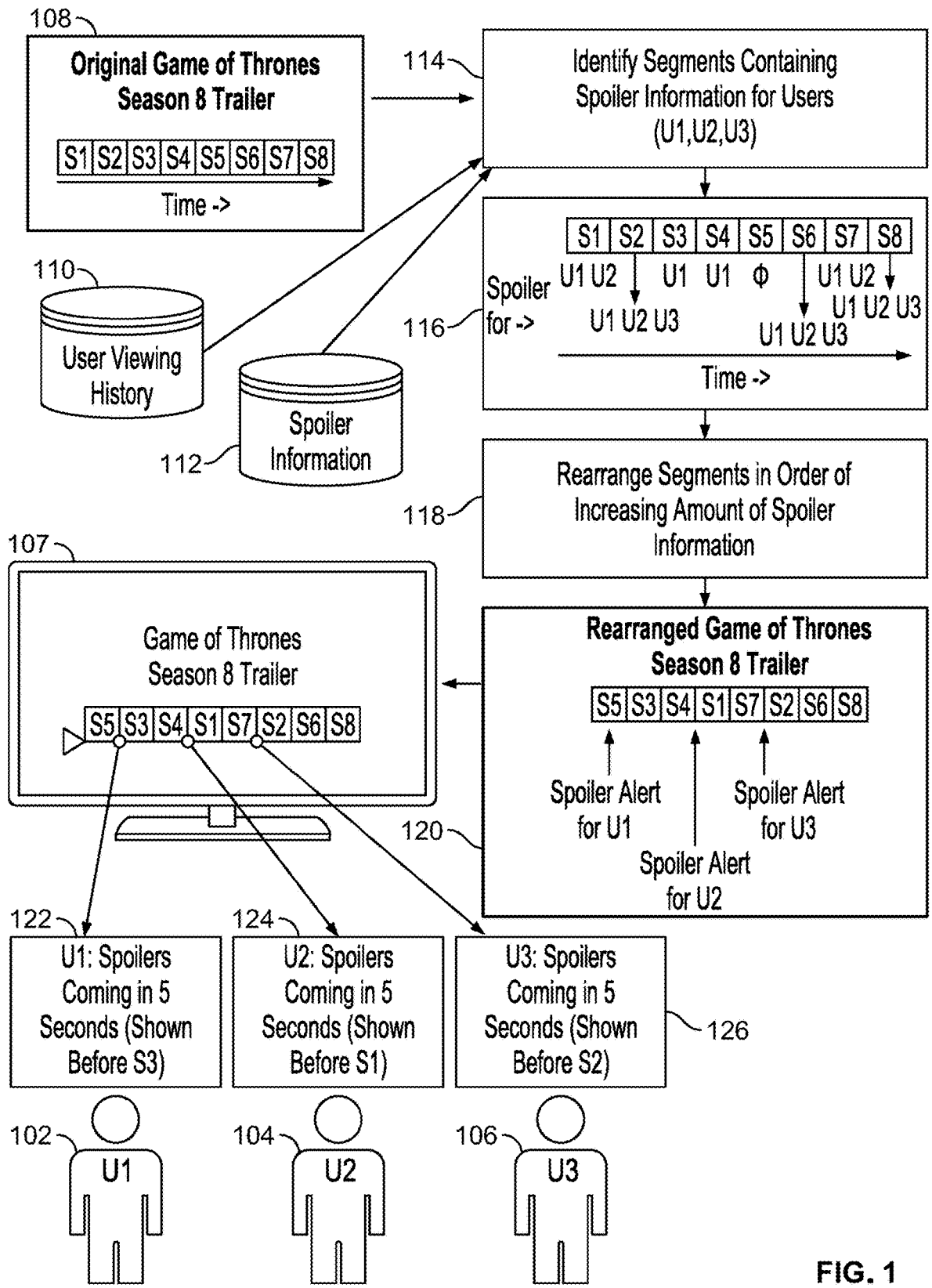
FIG. 1 shows an illustrative process for rearranging segments of a trailer for a media content series based on spoiler information, in accordance with some embodiments of the disclosure.

FIG. 1 shows an illustrative process for rearranging segments of a trailer for a media content series based on spoiler information, in accordance with some embodiments of the disclosure. As shown, a first user 102, a second user 104, and a third user 106 are viewing a TV 107 which is about to play a trailer (i.e., the Game of Thrones Season 8 trailer 108) for a content series (i.e., Game of Thrones) having a plurality of episodes. As shown, the original Game of Thrones Season 8 trailer 108 may be composed of eight segments S1-S8 arranged in a predetermined order with respect to time (i.e., in the original order established by the creator of the trailer).

Before playing the original Game of Thrones Season 8 trailer 108, the media player application may identify users within viewing range of the TV 107. For example, the media player application may identify users using information obtained from a device associated with the user (e.g., a smartwatch or smartphone), using cameras and facial recognition techniques, or other identification techniques. As shown, the media player application may identify the first user 102, the second user 104, and the third user 106 in proximity to the TV 107. Based on the identity of the users, the media play application may retrieve, from a user viewing history database 110, a viewing history of each of the first user 102, the second user 104, and the third user 106. In some embodiments, the viewing histories of the users may be stored in user profiles. The information in each of the user profiles may be automatically compiled by tracking the content that each of the users consumes.

Figures 2, 3:
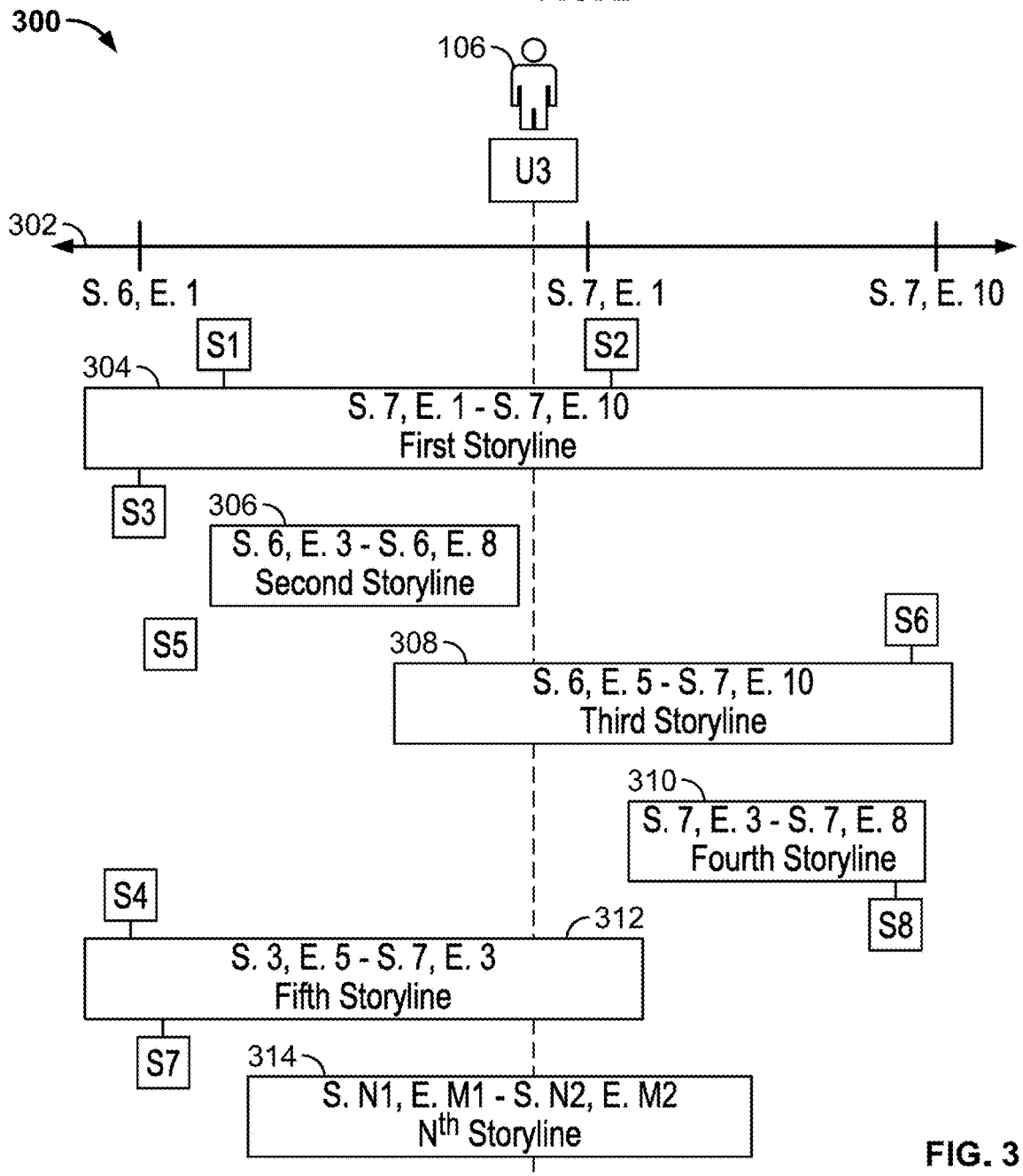
FIG. 2 depicts an illustrative data record of user viewing history information that is retrieved from a user viewing history database, in accordance with some embodiments of the disclosure.
FIG. 3 shows an illustrative diagram of identifying segments containing spoiler information for a specific user, in accordance with some embodiments of the disclosure.

FIG. 2 depicts an illustrative data record of user viewing history information 200 that is retrieved from the user viewing history database 110, in accordance with some embodiments of the disclosure. As shown, the user viewing history information 200 may be a user viewing history that is related to the trailer 108 that is to be played (i.e., a user viewing history of Game of Thrones). As shown, user viewing history 202 (for the first user 102) includes the user ID ("Andy R") and the latest episode that Andy R. watched in Game of Thrones ("season 4, episode 7"). Similarly, user viewing history 204 (for the second user 104) includes the user ID ("John H") and the latest episode that John H. watched in Game of Thrones ("season 5, episode 10"), while user viewing history 206 (for the third user 106) includes the user ID ("Sarah S.") and the latest episode that Sarah S. watched in Game of Thrones ("season 6, episode 10"). Although the latest episode that the user watched is illustrated in the user viewing history, the user viewing history may also include each of the episodes that a user has watched (e.g., including possible episodes that a user has skipped), as well as previous trailers for Game of Thrones that a user has watched.

The media player application may identify segments, of the plurality of segments S1-S8, that contain spoiler information for any of the first user 102, the second user 104, and the third user 106, based on the respective viewing histories (202, 204, 206) (Step 114). To do this, the media player application may access a spoiler information database 112, which contains information about Game of Thrones (e.g., storylines, plots, characters, events, etc.) that can be used to identify spoiler information based on a user's viewing history of Game of Thrones. An example of identifying spoiler information for a user (the third user 106) using information accessed from the spoiler information database 112 is described below with reference to FIG. 3.

FIG. 3 shows an illustrative diagram 300 of identifying segments containing spoiler information for a specific user (e.g., the third user 106), in accordance with some embodiments of the disclosure. As shown, the information obtained from the spoiler information database 112 may include one or more storylines, which are narratives that, along with other narratives, make up a plot of the content series (i.e., Game of Thrones). Portions of the content series may correspond to various storylines. As shown, the spoiler information database 112 includes a first storyline 304, a second storyline 306, a third storyline 308, and fourth storyline 310, a fifth storyline 312, and an $N^{th}$ storyline 314. Certain content may be related to the multiple storylines. Content may contain contiguous storylines or may switch between several storylines. As illustrated in FIG. 3, additional information may include the beginning and end points of each storyline (e.g., the first storyline 304 spans the entire series—from season 1, episode 1—season 7, episode 10). Additional information may also include dependency information between storylines and other relevant information. In some embodiments, information describing the storylines may be stored in the metadata of the content.

As shown, the storylines may be arranged along a timeline 302 of the content series. The timeline 302 may span all of the episodes of the content series that are currently available (e.g., season 1, episode 1—season 7, episode 10). As more episodes of the content series are made available, the information in the spoiler information database 112 may be updated. Additionally, based on the user viewing history 206 of the third user 106, the third user 106 is arranged along the timeline 302.

As shown, the media player application may determine which storylines each of the segments S1-S8 is related to. The media player application may also determine the specific location within the storyline that a segment is related to. For example, the first storyline 304 may be related to "Jon Snow"—one of the pivotal characters of Game of Thrones. In the first storyline 304, Jon Snow is supposed to have died at the end of season 5 (i.e., season 5, episode 10). During season 6, episode 2, it is revealed that Jon Show has come back to life. Segment 1 includes a clip of Jon Snow alive and engaged in a battle. Accordingly, for a user who has not seen season 6, episode 2, this revelation that Jon Snow is still alive would be a spoiler. Accordingly, segment 1 is determined to be a spoiler if the user has not yet viewed season 6, episode 2. The specific location within the first storyline 304 that segment 1 is linked to is the location in the storyline that, if watched, viewing this segment would no longer be a spoiler.

Segment 2 may include a clip of Jon Snow together with "Daenerys Targaryen"—another one of the pivotal characters of the series. However, Jon Snow and Daenerys Targaryen do not become romantically linked until season 7, episode 1. Thus, if the user has not yet watched season 7, episode 1, segment 2 may be a spoiler. Thus, as shown, segment 2 is linked to this portion of the first storyline 304. Segments may be related to more than one storyline. For example, segment 2, which involves both Jon Snow and Daenerys Targaryen, may be linked to both Jon Snow's storyline and Daenerys Targaryen's storyline, as well as other storylines.

As shown, the remaining segments S3-S8 may also be linked to storylines in a similar manner as segments S1 and S2. For example, as shown, segment S3 may be linked to the first storyline 304, segment 4 may be linked to the fifth storyline 312, segment 6 may be linked to the third storyline 308, segment 7 may be linked to the fifth storyline 312, and segment S8 may be linked to the fourth storyline 310. Additionally, it is possible that a segment may not be linked to a particular storyline included in the spoiler information database 112. For example, segment 5 may simply be a clip showing the "Iron Throne" that is not linked to any particular storyline and that does not act as a spoiler for any user, regardless of their viewing history.

After processing all of the segments S1-S8 with the information in the spoiler information database 112, the media player application may determine, using the user viewing history information of each user, whether a segment contains spoiler information for that user. For example, as shown in FIG. 3, the third user 106 is located at a position along the timeline 302 that corresponds to their viewing history (i.e., season 6, episode 10). Thus, as shown, segments S2, S6, and S8 may be identified as containing spoiler information for the third user 106. That is, they are determined to include information that reveals important plot elements that the third user 106 does not currently know about and which are not intended to be known by the user before watching the content. However, this is merely illustrative and spoiler information may be also be preprocessed and a lookup table used to identify segments containing spoiler information by simply inputting the viewing history of a user (e.g., the last episode that the user watched.

Similar to the above, as also illustrated in FIG. 1, segments S1, S2, S6, S7, and S8 may be identified as containing spoiler information for the second user 104, while segments S1-S4 and S6-S8 may be identified as containing spoiler information for the first user 102. As shown, the tagged segments 116 may be tagged for each of the users viewing the trailer.

As shown in FIG. 1, after identifying the segments containing spoiler information for each of the users, the media player application may rearrange the segments in order of increasing amount of spoiler information (step 118). That is, for each segment, the media player application may determine how many users the segment contains spoiler information for. As shown in the tagged segments 116, segment S1 contains spoiler information for two users, segment S2 contains spoiler information for three users, segment S3 contains spoiler information for one user, segment S4 contains spoiler information for one user, segment S5 does not contain any spoiler information, segment S6 contains spoiler information for three users, segment S7 contains spoiler information for two users, and segment S8 contains spoiler information for three users. After determining the number of users each of the segments S1-S8 contains spoiler information for, the media player application may rearrange the segments in increasing number of users. That is, segments containing spoiler information for the fewest number of users are shown first, while segments containing spoiler information for the greatest number of users are shown last. For segments that contain spoiler information for the same number of users, the original order of the segments (with respect to each other) is maintained.

As shown in the rearranged Game of Thrones Season 8 Trailer 120, the segments S1-S8 are rearranged in the order of S5, S3, S4, S1, S7, S2, S6, to S8. Due to the rearranged order of segments, every segment after segment S5 contains spoiler information for the first user 102, every segment after segment S4 contains spoiler information for the second user 104, and every segment after segment S7 contains spoiler information for the third user 106. Thus, as shown, the media player application may insert a single personalized spoiler alert for each user to warn that user that the remaining portion of the trailer contains spoiler information for that user. Specifically, the media player application may insert a first personalized spoiler alert 122 for the first user 102 to be shown before segment S3, a second personalized spoiler alert 124 for the second user 104 to be shown before segment S1, and a third personalized spoiler alert 126 for the third user to be shown before segment S3. The rearranged trailer 120 and personalized spoiler alerts (122, 124, and 126) may then be shown on the TV 107 to the first user 102, the second user 104, and the third user 106. Because each of the users is warned about spoiler information before it is shown, the users can still enjoy parts of the trailer, without viewing any spoiler information.

Figure 4:
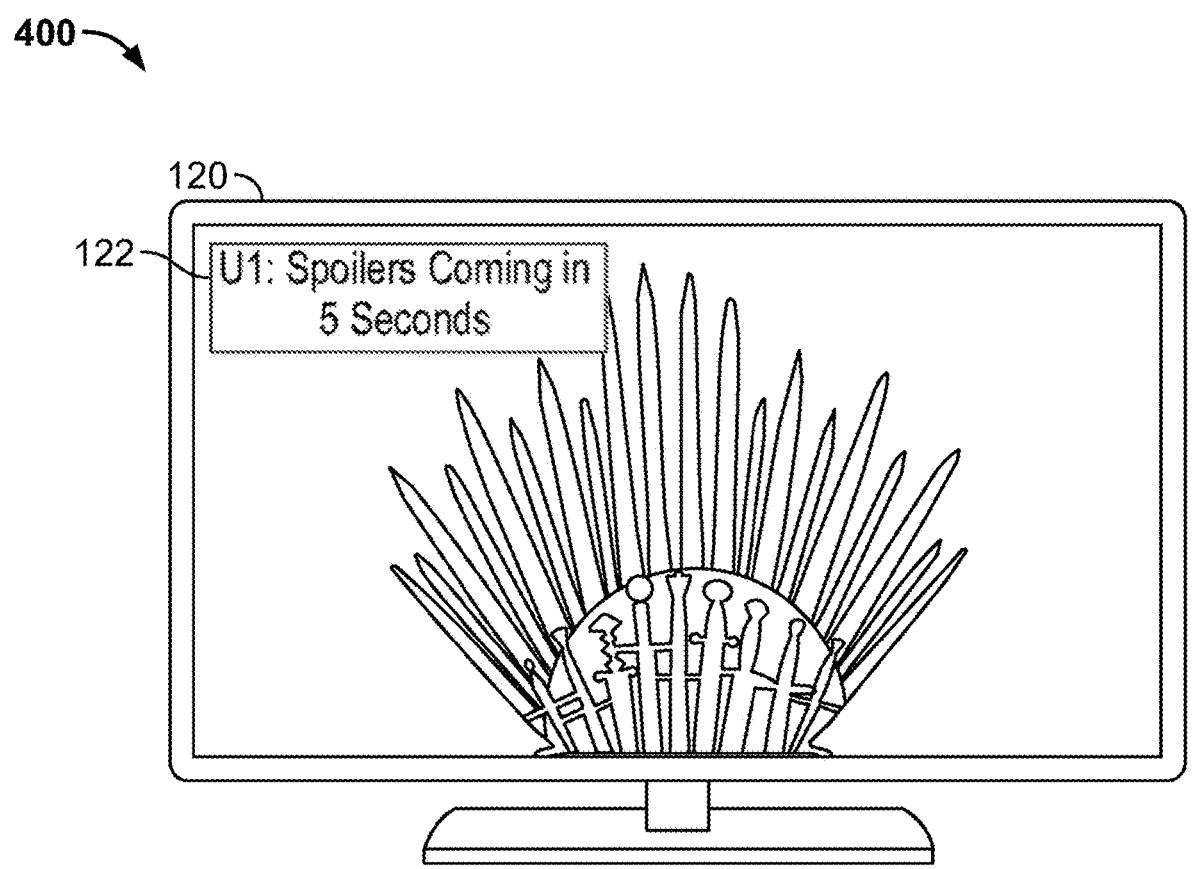
FIG. 4 provides an example screen illustrating a personalized spoiler alert being shown while the rearranged trailer is being played, in accordance with some embodiments of the disclosure.

FIG. 4 provides an example screen 400 illustrating a personalized spoiler alert being shown while the rearranged trailer 120 is being played, in accordance with some embodiments of the disclosure. As shown, while the rearranged trailer 120 is being played, before segment S3 is displayed, personalized spoiler alert 122 for the first user 102 is overlaid on the displayed rearranged trailer 120. The personalized spoiler alert 122 may be shown for a predetermined amount of time (e.g., five seconds) in a corner of the screen so most of the rearranged trailer 120 is still visible to the users. The personalized spoiler alert 122 may include a personalized warning for the first user 102 that "spoilers are coming in 5 seconds." Thus, in some embodiments, the personalized spoiler alert 122 may be displayed for five seconds, beginning five seconds before segment S3 is shown. However, this is only an example, and the personalized spoiler alert 122 may be shown less than 5 seconds before segments S2 is shown. Personalized spoiler alerts 124 and 126 may be shown later in the trailer at the prescribed times for the second user 104 and the third user 106, as described above.

Figure 5:
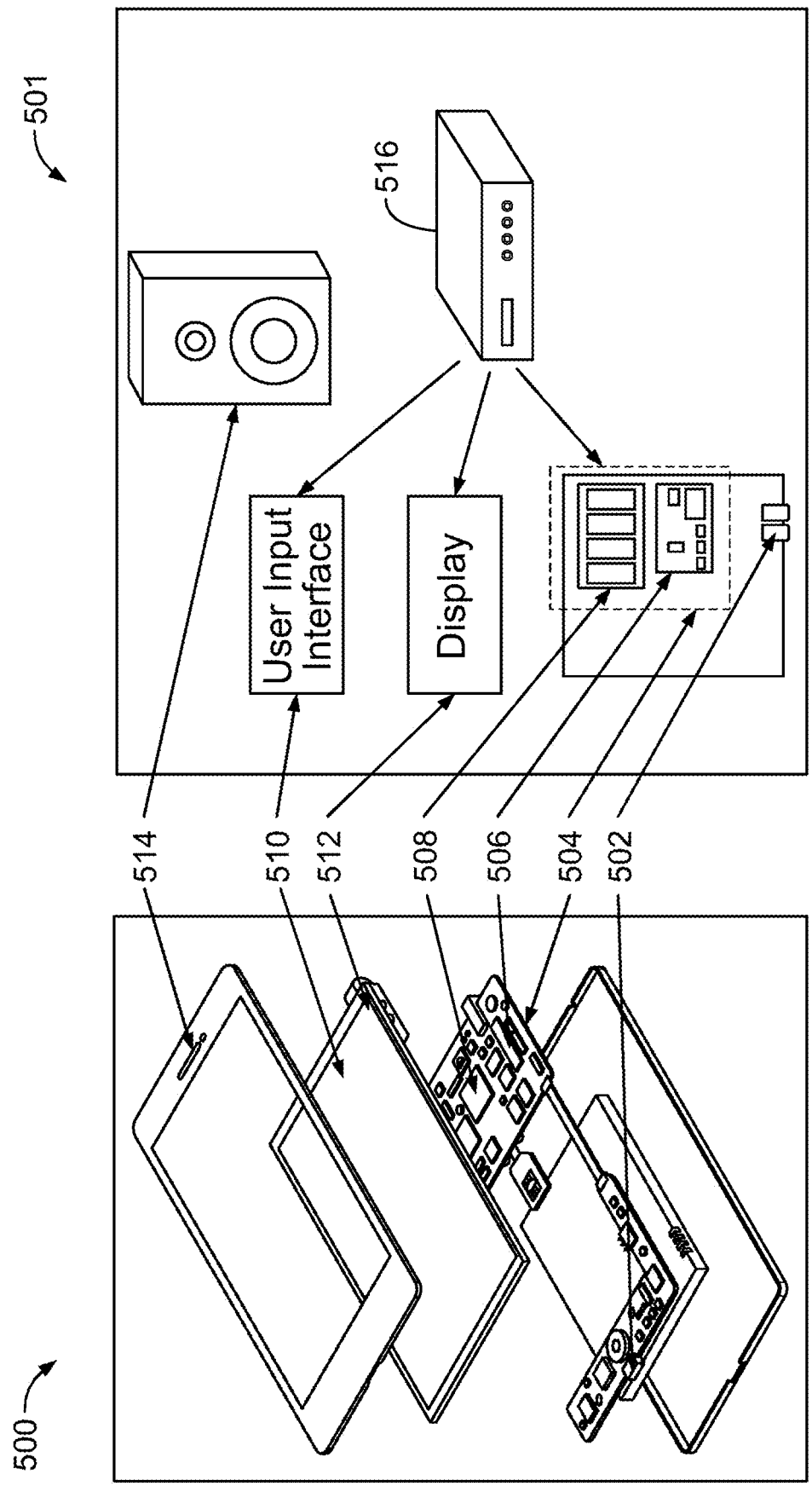
FIGS. 5-6 describe exemplary devices, systems, servers, and related hardware for rearranging segments of a trailer for a media content series based on spoiler information, in accordance with some embodiments of the disclosure.
Figure 6:
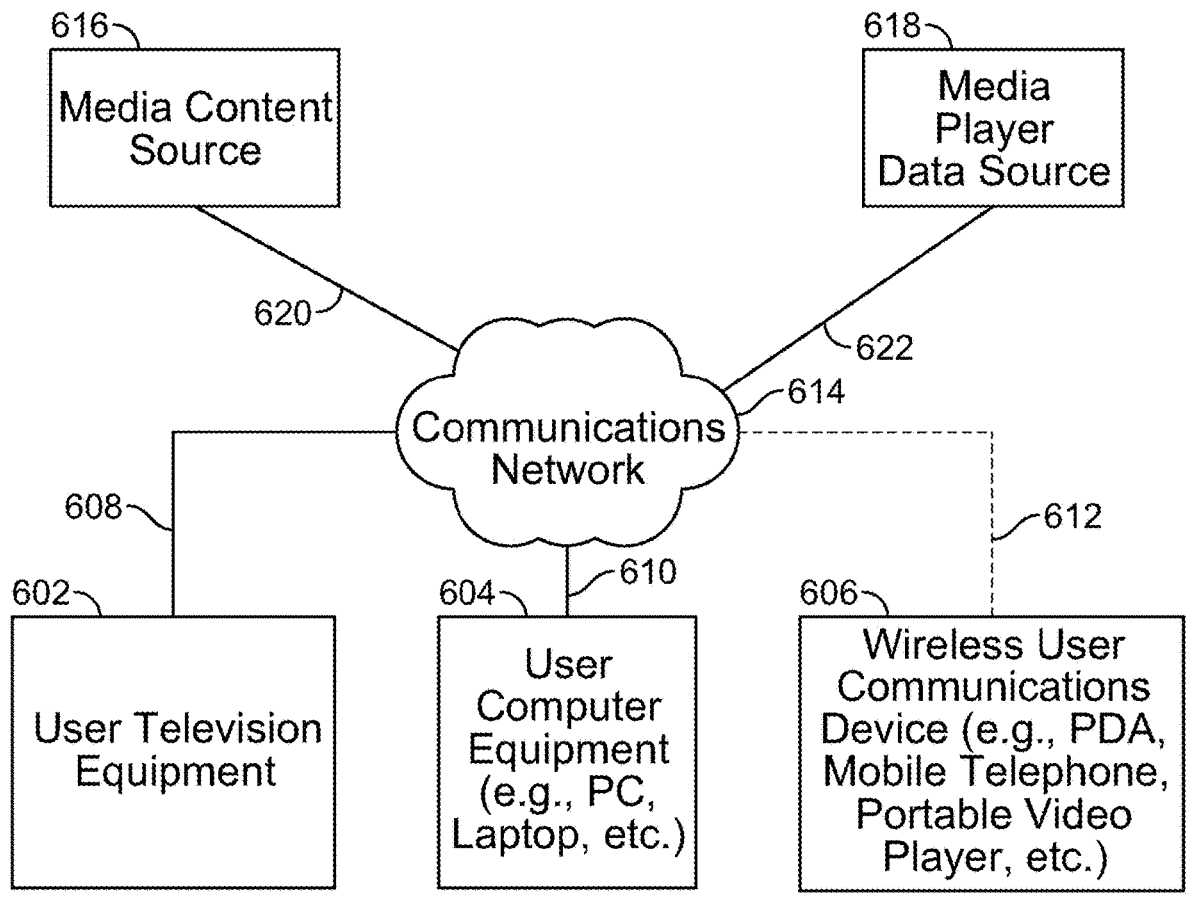

FIGS. 5-6 describe exemplary devices, systems, servers, and related hardware for rearranging segments of a trailer for a media content series based on spoiler information, in accordance with some embodiments of the disclosure. FIG. 5 shows generalized embodiments of illustrative user equipment devices 500 and 501. For example, user equipment device 500 may be a smartphone device. In another example, user equipment system 501 may be a user television equipment system (e.g., TV 107). User television equipment system 501 may include a set-top box 516. Set-top box 516 may be communicatively connected to speaker 514 and display 512. In some embodiments, display 512 may be a television display or a computer display. In some embodiments, set top box 516 may be communicatively connected to user interface input 510. In some embodiments, user interface input 510 may be a remote control device. Set-top box 516 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of user equipment devices are discussed below in connection with FIG. 6. Each one of user equipment device 500 and user equipment system 501 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media player application stored in memory (i.e., storage 508). Specifically, control circuitry 504 may be instructed by the media player application to perform the functions discussed above and below. For example, the media player application may provide instructions to control circuitry 504 to generate the media player displays. In some implementations, any action performed by control circuitry 504 may be based on instructions received from the media player application.

In client-server based embodiments, control circuitry 504 may include communications circuitry suitable for communicating with a media player application server or other networks or servers. The instructions for carrying out the above mentioned functionality may be stored on the media player application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media player data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment system 501. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media player application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of each one of user equipment device 500 and user equipment system 501 or may be stand-alone units. The audio component of videos and other content displayed on display 512 may be played through speakers 514. In some embodiments, the audio may be distributed to a receiver (not shown), which processes and outputs the audio via speakers 514.

The media player application may be implemented using any suitable architecture. For example, it may be a stand-alone application wholly-implemented on each one of user equipment device 500 and user equipment system 501. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to rearrange the segments as discussed. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media player application is a client-server based application. Data for use by a thick or thin client implemented on each one of user equipment device 500 and user equipment system 501 is retrieved on-demand by issuing requests to a server remote to each one of user equipment device 500 and user equipment system 501. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and to rearrange the segments as discussed. The client device may receive the rearranged segments and may display the rearranged trailer on user equipment device 500. This way, the processing of the instructions is performed remotely by the server while the resulting display is provided locally on user equipment device 500. User equipment device 500 may receive inputs from the user via input interface 510 and transmit those inputs to the remote server for processing.

In some embodiments, the media player application is downloaded and interpreted or otherwise run by an interpreter or virtual machine (run by control circuitry 504). In some embodiments, the media player application may be encoded in the ETV Binary Interchange Format (EBIF), received by control circuitry 504 as part of a suitable feed, and interpreted by a user agent running on control circuitry 504. For example, the media player application may be an EBIF application. In some embodiments, the media player application may be defined by a series of JAVA-based files that are received and run by a local virtual machine or other suitable middleware executed by control circuitry 504. In some of such embodiments (e.g., those employing MPEG-2 or other digital media encoding schemes), the media player application may be, for example, encoded and transmitted in an MPEG-2 object carousel with the MPEG audio and video packets of a program.

Each one of user equipment device 500 and user equipment system 501 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media player application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some user television equipment 602, include a tuner allowing for access to television programming. The media player application may have the same layout on various different types of user equipment or may be tailored to the display capabilities of the user equipment. For example, on user computer equipment 604, the media player application may be provided as a web site accessed by a web browser. In another example, the media player application may be scaled down for wireless user communications devices 606.

In system 600, there is typically more than one of each type of user equipment device, but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media player application settings across in-home devices and remote devices. Settings include those described herein, as well as channel and program favorites, programming preferences that the media player application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 602-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media player data source 618 coupled to communications network 614 via communication paths 620 and 622, respectively. Paths 620 and 622 may include any of the communication paths described above in connection with paths 608, 610, and 612. Communications with the content source 616 and media player data source 618 may be exchanged over one or more communications paths, but are shown as a single path in FIG. 6 to avoid overcomplicating the drawing. In addition, there may be more than one of each of content source 616 and media player data source 618, but only one of each is shown in FIG. 6 to avoid overcomplicating the drawing. (The different types of each of these sources are discussed below). If desired, content source 616 and media player data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices.

Media player applications may be, for example, standalone applications implemented on user equipment devices. For example, the media player application may be implemented as software or a set of executable instructions which may be stored in storage 508, and executed by control circuitry 504 of each one of user equipment device 500 and user equipment system 501. In some embodiments, media player applications may be client-server applications where only a client application resides on the user equipment device, and server application resides on a remote server. For example, media player applications may be implemented partially as a client application on control circuitry 504 of each one of user equipment device 500 and user equipment system 501 and partially on a remote server as a server application (e.g., media player data source 618) running on control circuitry of the remote server. When executed by control circuitry of the remote server (such as media player data source 618), the media player application may instruct the control circuitry to rearrange the segments and transmit the rearranged segments to the user equipment devices. The server application may instruct the control circuitry of the media player data source 618 to transmit data for storage on the user equipment. The client application may instruct control circuitry of the receiving user equipment to rearrange the segments.

Content and/or media player data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media player data described above. In addition to content and/or media player data, providers of OTT content can distribute media player applications (e.g., web-based applications or cloud-based applications), or the content can be displayed by media player applications stored on the user equipment device.

Media player system 600 is intended to illustrate a number of approaches, or network configurations, by which user equipment devices and sources of content and guidance data may communicate with each other for the purpose of accessing content and trailers for that content. The embodiments described herein may be applied in any one or a subset of these approaches, or in a system employing other approaches for delivering content and providing media player.

Figure 7:
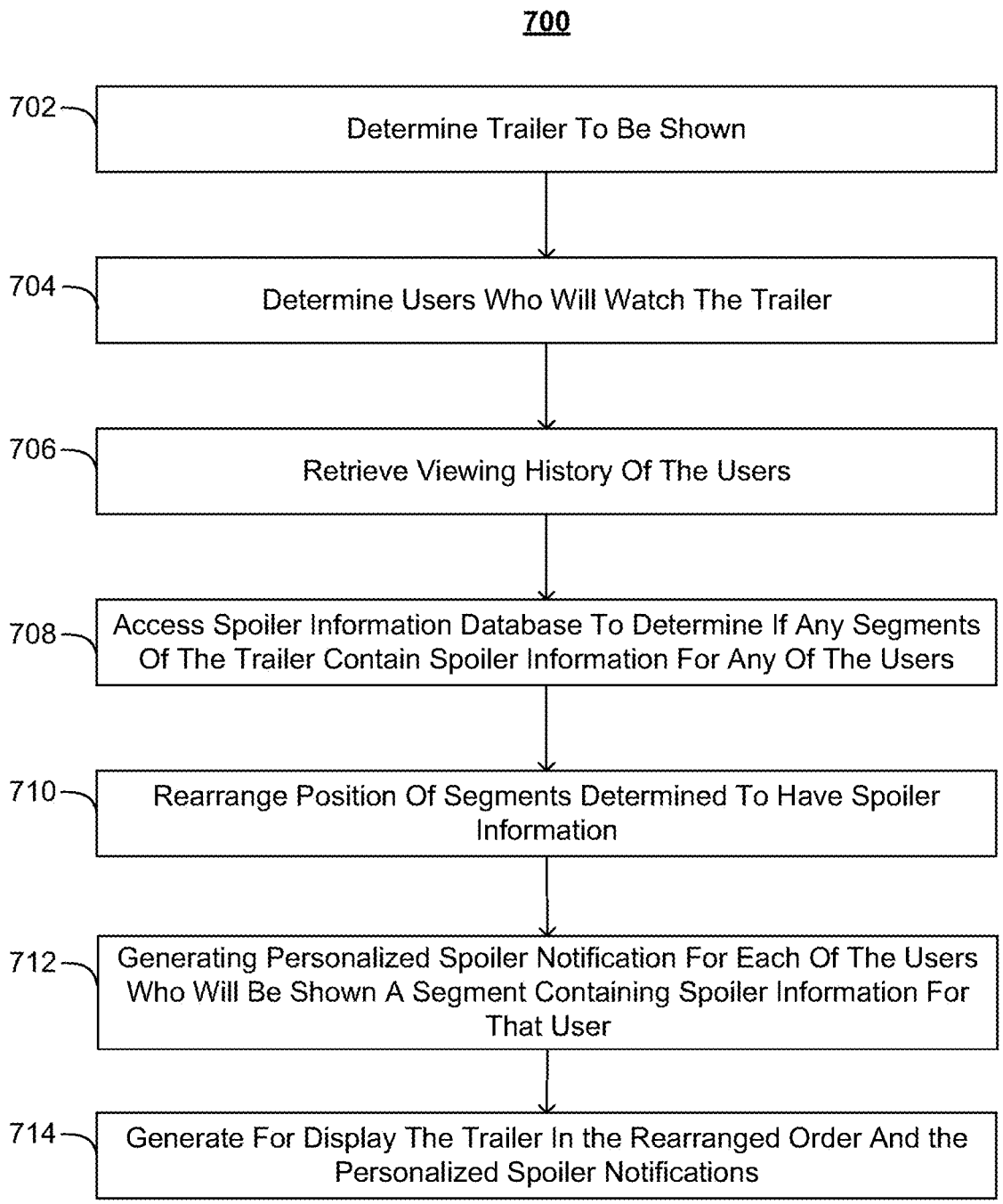
FIG. 7 depicts an illustrative flowchart of a process of rearranging segments of a trailer for media content based on spoiler information, in accordance with some embodiments of the disclosure.

FIG. 7 depicts an illustrative flowchart of a process of rearranging segments of a trailer for media content based on spoiler information, in accordance with some embodiments of the disclosure. Process 700 may be executed by control circuitry 504 (e.g., in a manner instructed to control circuitry 504 by the media player application). Control circuitry 504 may be part of user equipment (e.g., a device which may have any or all of the functionality of user television equipment 602, user computer equipment 604, and/or wireless communications device 606), or of a remote server separated from the user equipment by way of communication network 614, or distributed over a combination of both. It should be noted that process 700, or any step thereof, could be performed on, or provided by, any of the devices shown in FIGS. 1 and 4-6.

Process 700 begins at step 702, when the media play application (e.g., via the control circuitry 504) determines a trailer for a content series to be shown. The trailer may be selected by a user through a user interface, may be scheduled to automatically play at the end of an episode of the series content that is currently playing, or may be shown as an advertisement or commercial.

At step 704, the media player application (e.g., via the control circuitry 504) may determine the users who will watch the trailer. For example, the media player application may identify users within viewing range of the display the trailer will be shown on (e.g., user equipment device 500 or television equipment system 501). The media player application may use any known identification techniques to identify the users. As one example, the media player application may identify users using information obtained from a device associated with the user. For example, the media player application may use near field communication capabilities of the user equipment device 500 to identify the device associated with the user. As another example, the media player application may use a camera of the user equipment device 500 to capture faces of the user and process the captured images with facial recognition techniques. Additionally or alternatively, the users may provide their identities directly to the media player application (e.g., via the user input interface 510).

At step 706, the media player application (e.g., via the control circuitry 504) may retrieve, from a server or database (e.g., the user viewing history database 110), a viewing history of each of the identified users. The retrieved viewing history may be a user's viewing history of the content series that the trailer is for and may indicate the latest episode of the content series that the user has watched. Alternatively, the user's viewing history may be a complete list of episodes of the content series that the user has watched.

At step 708, the media player application (e.g., via the control circuitry 504) may access a server or database (e.g., spoiler information database 112) to determine if any segments of the trailer contain spoiler information for any of the identified users. For example, the media player application may determine if the segment corresponds to a storyline of the content series that is stored in a server or database. The media player application may then determine if the user has viewed that portion of the storyline and if the segment would be a spoiler for a user viewing the storyline. The media player application may also input the user viewing history (e.g., the latest episode watched) into a preprocessed lookup table of spoiler information to identify the segments containing spoiler information. Alternatively, segments of the trailer may be pre-tagged with extra information (e.g., metadata) indicating the earliest episode a user is required to have seen for the segment not to contain spoiler information. The media player application may simply compare the viewing history of the user with the extra information to determine if the segments contain spoiler information.

At step 710, the media player application (e.g., via the control circuitry 504) may rearrange the position of segments determined to have spoiler information for at least one user. To do this, the media player application may determine, for each of the segments in the trailer, how many users the segment contains spoiler information for. The media player application may then rearrange the segments in order of increasing spoiler information (i.e., from segments containing spoiler information for the fewest number of users to segments containing spoiler information for the greatest number of users). In some embodiments, for segments containing spoiler information for the same number of users, the original order of the segments (with respect to each other) may be maintained.

At step 712, the media player application (e.g., via the control circuitry 504) may generate a personalized spoiler notification for each of the users who will be shown a segment containing spoiler information for that user. The media player application may arrange each of the personalized spoiler notifications to be shown immediately before the segment containing spoiler information for that user is shown.

At step 714, the media player application (e.g., via the control circuitry 504) may generate for display (e.g., on the display 512 of user equipment device 500 or user equipment system 501) the trailer in the rearranged order and the personalized spoiler notifications. The rearranged trailer may be shown from beginning to end without stopping, and the personalized spoiler notifications may be shown for a predetermined time before segments containing spoiler information for the respective users. In some embodiments, the personalized spoiler notifications may be overlaid over a small portion of the rearranged trailer, so that most of the rearranged trailer is still visible to the users while each of the personalized spoiler notifications are shown. However, this is only one example, and the personalized spoiler notifications may be displayed directly on a second display device (e.g., a user's smartphone). In another example, the personalized spoiler notifications may be audio notifications. For example, the media player application may cause the display device playing the rearranged trailer to issue an audio warning (e.g., "User one. A spoiler is coming in five seconds.").

It is contemplated that the steps or descriptions of FIG. 7 may be used with any other embodiment of this disclosure. In addition, the descriptions described in relation to the algorithm of FIG. 7 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the processes of FIG. 7 may be implemented on a combination of appropriately configured software and hardware, and that any of the devices or equipment discussed in relation to FIGS. 1 and 4-6 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for presenting trailers for media content, the method comprising:
retrieving data describing a first plurality of content items;
retrieving data describing a second plurality of content items viewed by a second viewer;
retrieving a trailer comprising a plurality of ordered segments;
determining at least one spoiler segment of the plurality of ordered segments comes from a content item that is in the first plurality of content items and not in the second plurality of content items;
generating a second trailer by rearranging the at least one spoiler segment within the plurality of ordered segments; and
providing the second trailer for consumption by the second viewer.

2. The method of claim 1 further comprising providing the trailer for consumption to a first viewer.

3. The method of claim 2, wherein the first plurality of content items were viewed by the first viewer.

4. The method of claim 1, wherein the rearranging the at least one spoiler segment within the plurality of ordered segments comprises rearranging the at least one spoiler segment to be last of the plurality of ordered segments.

5. The method of claim 1, wherein the determining at least one spoiler segment of the plurality of ordered segments comes from a content item that is in the first plurality of content items and not in the second plurality of content items further comprises comparing metadata associated with each of the plurality of ordered segments to the second plurality of content items.

6. The method of claim 1, wherein the data describing a first plurality of content items comprises a portion of a series comprising a plurality of episodes.

7. The method of claim 6, wherein the data describing a second plurality of content items viewed by a second viewer indicates episodes that the second viewer user has consumed from the plurality of episodes.

8. The method of claim 6, wherein the data describing a second plurality of content items viewed by a second viewer indicates a latest episode that the viewer has consumed from the plurality of episodes.

9. The method of claim 1, wherein the at least one spoiler segment of the plurality of ordered segments is associated with metadata identifying a spoiler segment.

10. The method of claim 1, wherein the providing the second trailer for consumption by the second viewer is performed without user input.

11. A system for presenting trailers for media content, the system comprising:
memory configured to:
store data describing a first plurality of content items;
store data describing a second plurality of content items viewed by a second viewer; and
store a trailer comprising a plurality of ordered segments; and
control circuitry configured to:
determine at least one spoiler segment of the plurality of ordered segments comes from a content item that is in the first plurality of content items and not in the second plurality of content items;
generate a second trailer by rearranging the at least one spoiler segment within the plurality of ordered segments; and
cause to provide the second trailer for consumption by the second viewer.

12. The system of claim 11, wherein the control circuitry is further configured to cause to provide the trailer for consumption to a first viewer.

13. The system of claim 12, wherein the first plurality of content items were viewed by the first viewer.

14. The system of claim 11, wherein the control circuitry is further configured to rearrange the at least one spoiler segment within the plurality of ordered segments by rearranging the at least one spoiler segment to be last of the plurality of ordered segments.

15. The system of claim 11, wherein the control circuitry is further configured to determine at least one spoiler segment of the plurality of ordered segments comes from a content item that is in the first plurality of content items and not in the second plurality of content items by comparing metadata associated with each of the plurality of ordered segments to the second plurality of content items.

16. The system of claim 11, wherein the data describing a first plurality of content items comprises a portion of a series comprising a plurality of episodes.

17. The system of claim 16, wherein the data describing a second plurality of content items viewed by a second viewer indicates episodes that the second viewer user has consumed from the plurality of episodes.

18. The system of claim 16, wherein the data describing a second plurality of content items viewed by a second viewer indicates a latest episode that the viewer has consumed from the plurality of episodes.

19. The system of claim 11, wherein the at least one spoiler segment of the plurality of ordered segments is associated with metadata identifying a spoiler segment.

20. The system of claim 11, wherein the control circuitry is further configured to provide the second trailer for consumption by the second viewer without user input.

\* \* \* \* \*